Aug. 20, 1968   H. VALADEZ ET AL   3,397,655

MACHINE FOR FORMING FLOUR TORTILLAS

Filed Dec. 14, 1966   3 Sheets-Sheet 1

Heliodoro Valadez
Rodolfo Perez
INVENTORS

Aug. 20, 1968          H. VALADEZ ETAL          3,397,655
                MACHINE FOR FORMING FLOUR TORTILLAS
Filed Dec. 14, 1966                        3 Sheets-Sheet 2
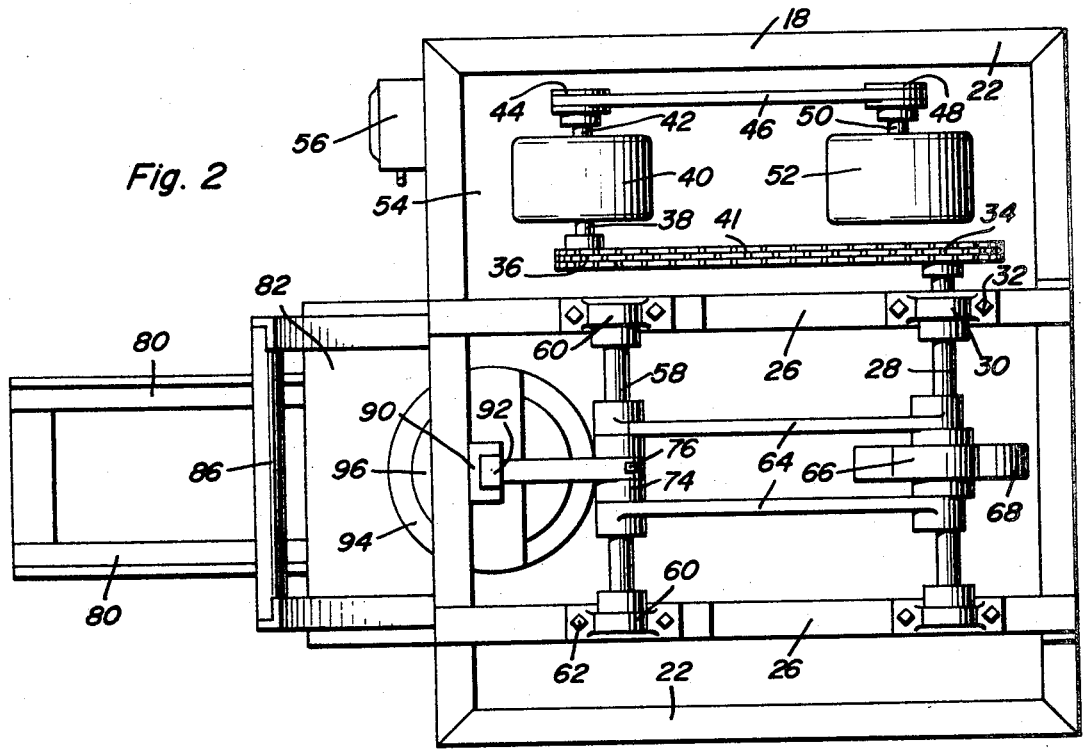
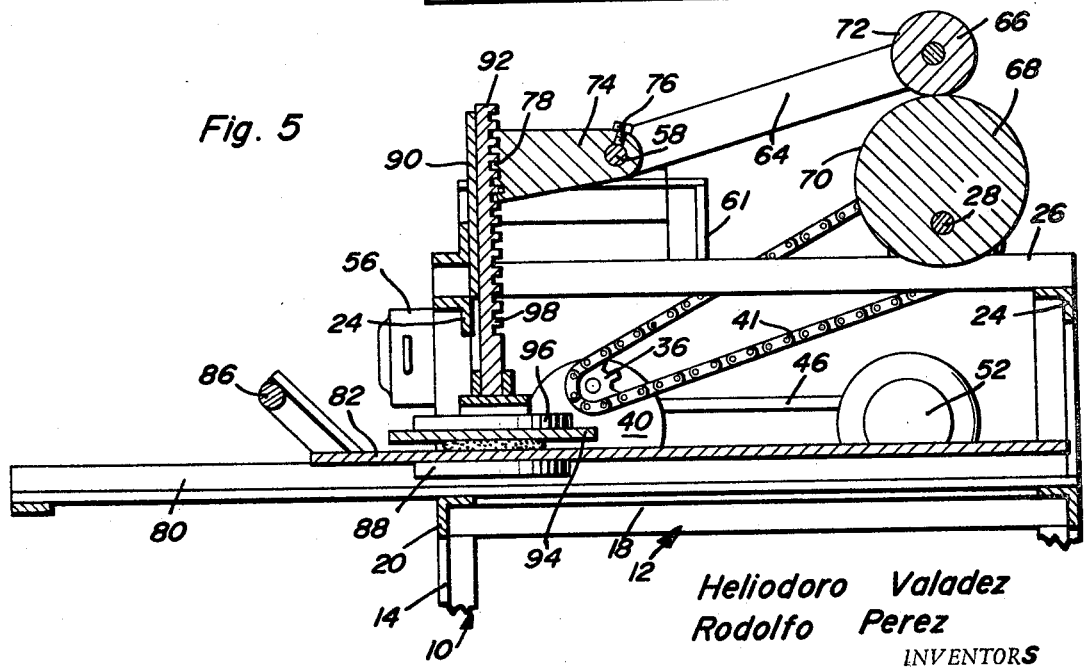
Heliodoro Valadez
Rodolfo Perez
INVENTORS Aug. 20, 1968  H. VALADEZ ETAL  3,397,655
MACHINE FOR FORMING FLOUR TORTILLAS
Filed Dec. 14, 1966  3 Sheets-Sheet 3
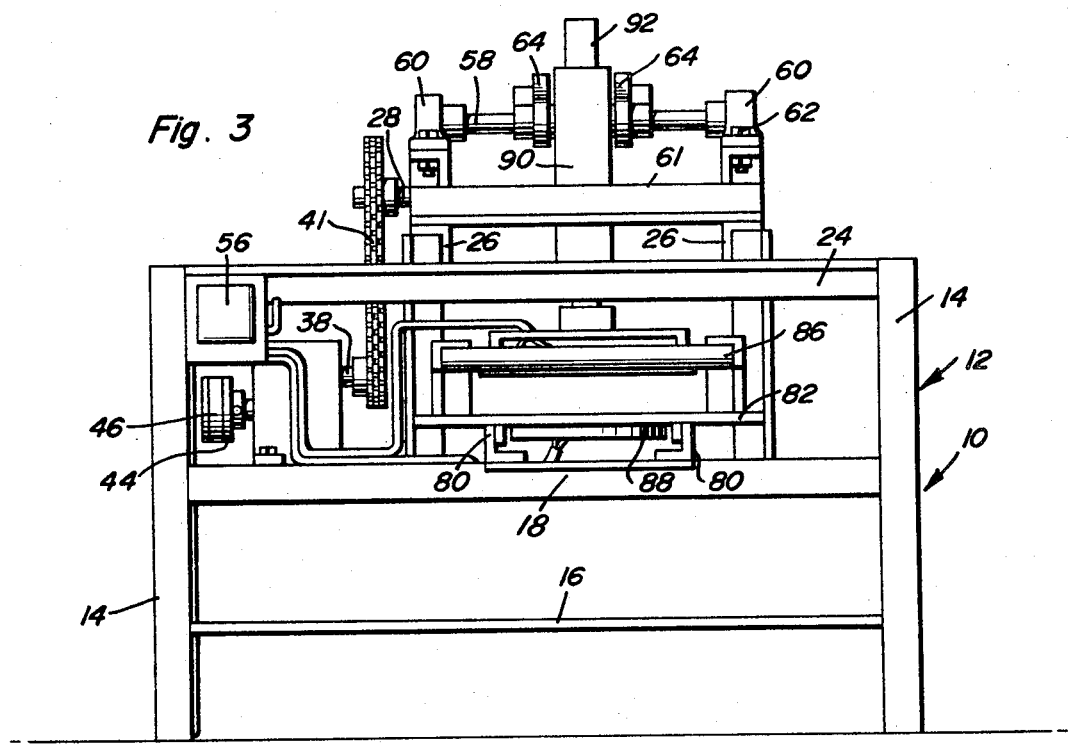
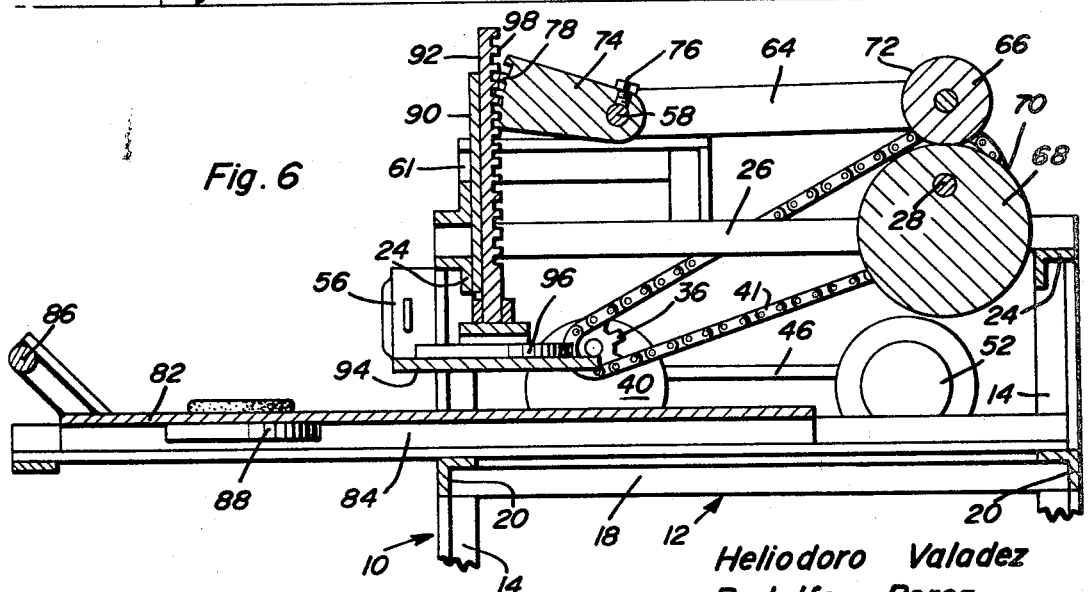
Heliodoro Valadez
Rodolfo Perez
INVENTORS

United States Patent Office 3,397,655
Patented Aug. 20, 1968

3,397,655
MACHINE FOR FORMING FLOUR TORTILLAS
Heliodoro Valadez, 7400 Alpine Drive 79915, and
Rodolfo Perez, 400 W. Franklin Ave. 79901,
both of El Paso, Tex.
Filed Dec. 14, 1966, Ser. No. 601,691
10 Claims. (Cl. 107—15)

ABSTRACT OF THE DISCLOSURE

A machine provided with first and second hot plate members and supported from a frame for oscillatory movement along intersecting paths disposed at generally right angles to each other and which include heated opposing and generally planar surfaces between which a lump or ball of dough may be flattened and at least partially surface cooked upon final movement of one of the hot plates towards its limit position of movement toward the intersection of the paths of movement of the hot plates subsequent to final movement of the other hot plate towards its limit position of movement toward the intersection of the paths of movement of the hot plates.

---

This invention relates to a machine for forming flour tortillas and which includes means for simultaneously flattening and at least partially surface cooking a ball of dough. The machine includes opposing heated surfaces mounted for relative movement toward and away from each other and between which a ball of dough to be flattened and at least partially surface cooked may be placed.

One of the heated surfaces is mounted for generally vertical reciprocal movement and is driven by a motor for continuous movement. The other heated surface is positioned to oppose the vertically movable heated surface whereupon a ball of dough to be flattened and at least partially surface cooked may be placed upon the heated surface opposing the vertically movable heated surface for flattening and at least partial cooking upon movement of the vertically movable heated surface toward the other heated surface upon which the ball of dough rests. Further, the heated surface upon which the ball of dough is adapted to be placed is shiftable horizontally into and out of vertical registry with the path of movement of the vertically movable heated surface. This horizontally movable heated surface is supported from a manually shiftable carriage and therefore the operator of the machine may, upon raising of the vertically movable heated surface, horizontally withdraw the other heated surface, remove the previously formed tortilla, place a new ball of dough on the horizontally movable heated surface, and then horizontally displace the horizontally movable heated surface with the ball of dough thereon into vertical alignment with the vertically movable heated surface just prior to its final downward movement to flatten the new ball of dough.

The main object of this invention is to provide a machine capable of semi-automatically forming tortillas and at least partially surface cooking the tortillas while they are being formed.

Another object of this invention is to provide a machine in accordance with the preceding object and which is constructed in a manner whereby the speed of movement of a driven portion thereof may be readily regulated as required to the speed of manual operation possible by the operator of the machine.

Still another object of this invention is to provide a machine in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a top plan view of the machine;

FIGURE 3 is a front elevational view of the machine;

Figure 1:
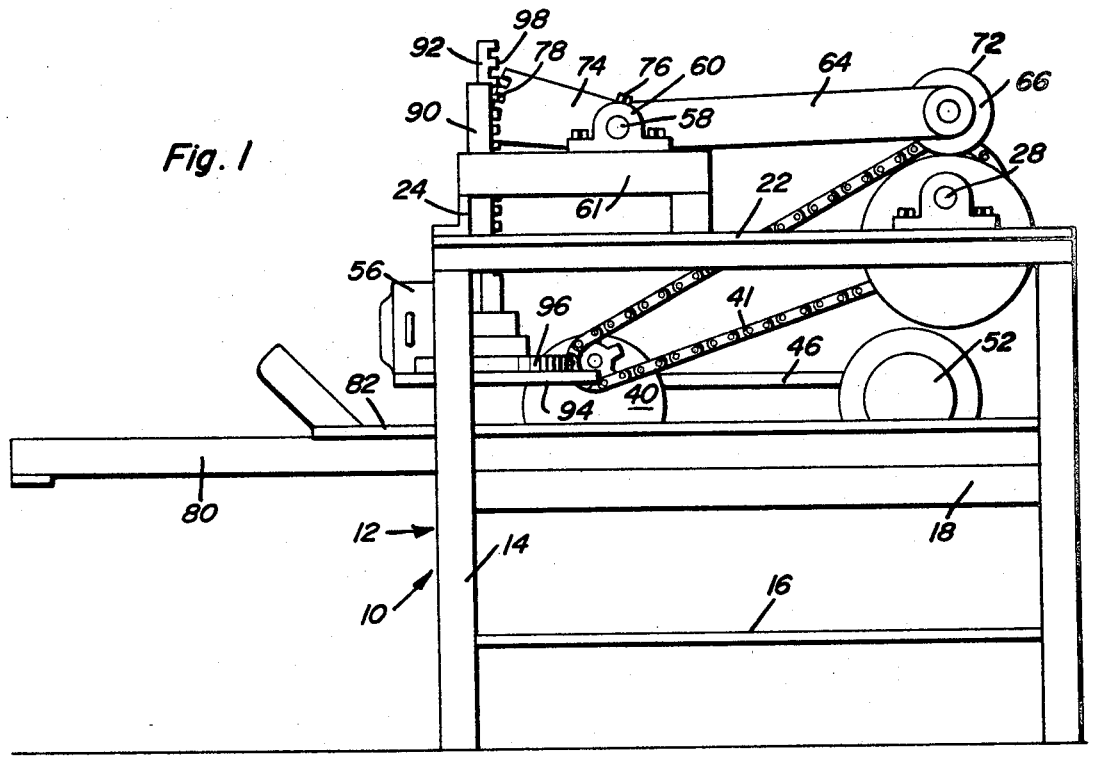
FIGURE 1 is a side elevational view of the machine of the instant invention.
Figure 4:
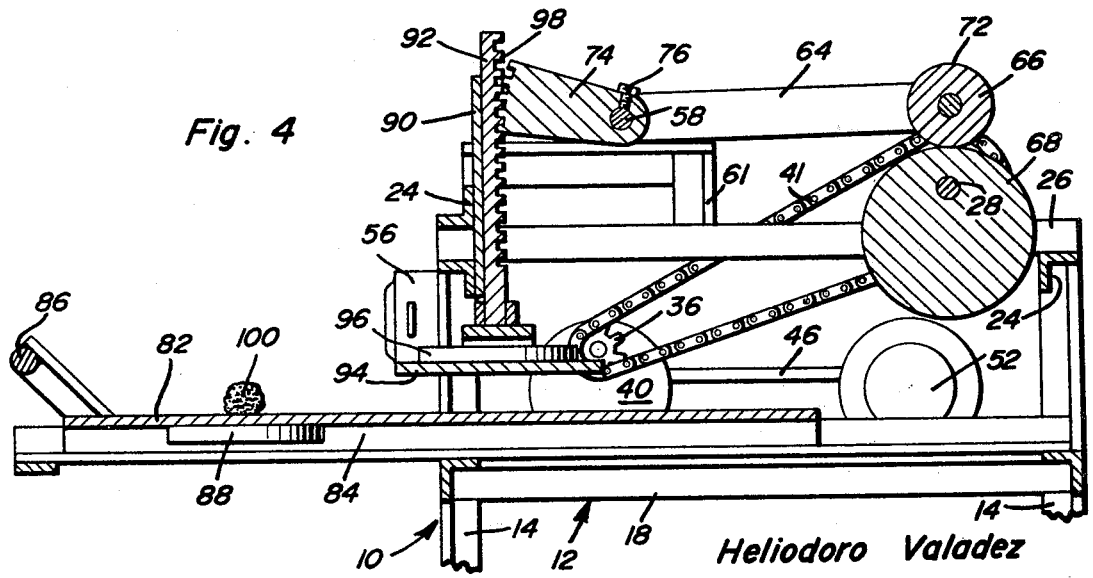
FIGURE 4 is a fragmentary longitudinal vertical sectional view of the machine taken substantially upon a plane passing through the center of the machine and with a ball of dough positioned on the horizontally movable hot plate portion of the machine prior to its being positioned beneath the vertically movable hot plate portion of the machine.

FIGURE 5 is a fragmentary sectional view similar to FIGURE 4 but illustrating the movable portions of the machine in positions operative to flatten and at least partially surface cook a ball of dough between the opposing hot plate portions of the machine; and FIGURE 6 is a fragmentary sectional view similar to FIGURES 4 and 5 but illustrating the relative positions of the movable portions of the machine after a flattened and at least partially surface cooked tortilla has been moved horizontally from under the vertically movable hot plate portion of the machine.

Referring now more specifically to the drawings the numeral 10 generally designates the machine of the instant invention. The machine 10 includes a frame referred to in general by the reference numeral 12 and including four generally parallel upstanding leg members 14 having a lower shelf 16 secured between their lower end portions. Further, the frame 12 includes pairs of opposite side and end brace members 18 and 20 secured between the leg members 14 centrally intermediate their upper and lower ends and pairs of opposite side and end brace members 22 and 24 secured between the upper ends of the leg members 14.

A pair of upper longitudinal brace members 26 are secured between the upper brace members 24 intermediate the upper brace members 22 and a driven shaft 28 is journaled from a pair of journal blocks 30 secured to one pair of corresponding ends of the brace members 26 in any convenient manner such as by fasteners 32. The shaft 28 has a sprocket wheel 34 mounted on one end portion projecting outwardly of the corresponding brace member 26 and which is aligned with a sprocket wheel 36 mounted on the output shaft 38 of a speed reducer 40 and drivingly connected thereto by means of an endless chain 41. The speed reducer 40 includes an input shaft 42 upon which a pulley 44 is mounted and an endless flexible belt 46 drivingly couples a pulley 48 mounted on the output shaft 50 of an electric motor 52 to the pulley 44. The motor 52 and speed reducer 40 are supported from a partial shelf 54 extending between the brace members 20 on one side of the frame 12. A control switch assembly 56 is supported from the frame 12 and is of course operatively electrically connected to a suitable source of electrical potential and electric motor 52 in any suitable manner (not shown).

An oscillating shaft 58 is oscillatably supported from journal blocks 60 secured to an upper frame section 61 in any convenient manner such as by fasteners 62 and a pair of lever arms 64 which are disposed in spaced apart generally parallel relation have one pair of corresponding ends secured to the oscillatable shaft 58 for oscillation therewith. The other pair of ends of the lever arms 64 rotatably journal a cam follower roller 66 therebetween and the driven shaft 28 has a cam disk 68 mounted thereon for rotation therewith and against whose generally cylindrical outer surface 70 the outer peripheral surface 72 of the cam follower roller 66 is rollingly engaged.

A third lever arm 74 is disposed on the oscillatable shaft 58 between the adjacent ends of the lever arms 64 and is secured in angular position relative to the shaft 58 by means of a setscrew 76. The free end of the lever arm 74 is provided with sector gear teeth 78 for a purpose to be hereinafter more fully set forth.

A pair of angle member guides 80 disposed in generally parallel relation are secured between the brace members 20 intermediate the brace members 18 and an elongated support panel 82 including depending flange portions 84 is supported from the angle member guides 80 for reciprocal movement therealong. The support panel 82 has a manually engageable handle 86 carried by one end thereof and an electrical heating element 88 which may be of 1000 watt rating is secured to the undersurface of the support panel 82. Further, an upstanding elongated guide 90 is supported from the frame section 61 at the front of the machine 10 and has an elongated longitudinally reciprocal follower 92 slidingly engaged therewith. The follower 92 is disposed in substantially vertical position and supports a generally planar and horizontally disposed panel 94 at its lower end having an electrical heating element 96 corresponding to the heating element 88 secured to its upper surface. The elongated follower 92 includes rack gear teeth 98 with which the sector gear teeth 78 are meshed and it is to be understood that the cam follower roller ends of the lever arms 64 are overbalanced so that the follower 92, the plate 94 and the heating element 96 will be raised by downward movement of the cam follower roller 66 by gravity.

The electric heating elements 88 and 96 are also electrically connected to the control switch assembly 56 for actuation thereby. In this manner, the electrical heating elements 88 and 96 may be simultaneously actuated with the actuation of the electric motor 52. Of course, suitable supplemental controls may be provided if desired in order to enable the heating elements 88 and 96 to be actuated independently of actuation of the motor 52.

In operation, a person operating the machine 10 will first actuate the control switch 56 to cause operation of the electric motor 52 and actuation of the heating elements 88 and 96. Then, after the heating elements 88 and 96 have sufficiently heated the adjacent portions of the plates 82 and 94, the operator of the machine 10 may place a ball 100 of dough on the support plate 82 immediately above the heating element 88. Then, as soon as operation of the motor 52 has effected upward movement of the plate 94, the operator of the machine 10 may inwardly displace the support plate 82 from the position thereof illustrated in FIGURE 4 of the drawings to the position thereof illustrated in FIGURE 5 of the drawings whereupon the next downward movement of the plate 84 will cause the ball 100 to be flattened in the manner illustrated in FIGURE 5 of the drawings and to be at least partially surface cooked. Then, upon upward movement of the plate 84 as the cam disk 68 rotates from the position thereof illustrated in FIGURE 5 of the drawings to the position thereof illustrated in FIGURE 4 of the drawings, the support plate 82 may be withdrawn from the position thereof illustrated in FIGURE 5 of the drawings to the position thereof illustrated in FIGURE 4 of the drawings and the flattened and at least partially surface cooked tortilla may be removed from the support plate 82 prior to the subsequent placing of a second ball 100 on the support plate 82 above the heating element 88. Then, during the next or a subsequent downward movement of the plate 94, the plate 82 may be again displaced inwardly from the position thereof illustrated in FIGURE 4 of the drawings to the position thereof illustrated in FIGURE 5 of the drawings resulting in the second ball 100 being flattened and at least partially surface cooked.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A machine for forming flour tortillas, said machine including a frame, first and second hot plate means supported from said frame for oscillatory movement along intersecting paths disposed at generally right angles to each other, motor means drivingly connected to one of said hot plate means for oscillating the latter along its path of movement, said second hot plate means including means adapted to be manually grasped for manually oscillating said second hot plate means along its path of movement in timed sequence with oscillation of said first hot plate means, said first and second hot plate means including generally planar heated surfaces between which a lump of dough is adapted to be flattened and at least partially surface cooked upon final movement of one of said hot plate means toward its limit position of movement toward the intersection of said paths subsequent to final movement of the other of said hot plate means toward its limit position of movement toward the intersection of said paths.

2. The combination of claim 1 wherein said motor means is drivingly connected to said one hot plate means.

3. The combination of claim 1 wherein said one hot plate means is mounted for oscillation along a generally vertical path and the other of said hot plate means is mounted for oscillation along a generally horizontally disposed path.

4. The combination of claim 1 wherein said frame includes guide means, said one hot plate being carried by follower means guidingly engaged with said guide means for generally vertical movement relative to said frame, level means pivotally supported intermediate its opposite ends from said frame for movement about a generally horizontal axis, said motor means being drivingly connected to said lever for raising and lowering one end thereof, the other end of said lever being operatively connected to said follower means for raising and lowering the latter in response to lowering and raising of said one end of said lever.

5. The combination of claim 4 wherein said other end of said lever is overbalanced so as to be urged downwardly by gravity and includes a cam follower portion, a cam movably supported from said frame and driven from said motor, said follower portion engaging said cam for intermittent upward displacement of said one end of said lever in response to movement of said cam by said motor.

6. The combination of claim 5 wherein said cam comprises a rotary cam member journaled from said frame for rotation about a generally horizontal axis.

7. The combination of claim 6 wherein said follower portion comprises a roller journaled from said one end of said lever for rotation about an axis generally paralleling the axis of rotation of said rotary cam member and disposed in rolling contacting relation with the latter.

8. The combination of claim 1 wherein said frame includes guide means, said one hot plate being carried by follower means guidingly engaged with said guide means for generally vertical movement relative to said frame, lever means pivotally supported intermediate its opposite ends from said frame for movement about a generally horizontal axis, said motor means being drivingly connected to said lever for raising and lowering one end thereof, the other end of said lever being operatively connected to said follower means for raising and lowering the latter in response to lowering and raising of said one end of said lever, said follower means including an upstanding portion including rack gear teeth, said other end of said lever including sector gear teeth meshed with said rack gear teeth.

9. A machine for forming flour tortillas, said machine including a frame, first and second hot plate means supported from said frame, and including opposing relatively movable and generally planar heated surface portions between which a lump of dough is adapted to be flattened and at least partially surface cooked upon movement of one of said surface portions toward the other, said one surface portion being mounted for oscillation along a predetermined path toward and away from the other surface portion, said frame including guide means, said one surface portion being supported from a member including rack gear teeth spaced along said path, said member being supported from said guide means for oscillation along said path, lever means pivotally supported intermediate its opposite ends from said frame for movement about a generally horizontal axis, motor means drivingly connected to said level for raising and lowering one end thereof, and sector gear teeth carried by the other end of said lever meshed with said rack gear teeth.

10. The combination of claim 9 wherein said other end of said lever is overbalanced so as to be urged downwardly by gravity and includes a cam follower portion, a cam movably supported from said frame and driven from said motor, said follower portion engaging said cam for intermittent upward displacement of said one end of said lever in response to movement of said cam by said motor, said cam comprising a rotary cam member journaled from said frame for rotation about a generally horizontal axis, said follower portion comprising a roller journaled from said one end of said lever for rotation about an axis generally paralleling the axis of rotation of said rotary cam member and disposed in rolling contacting relation with the latter.

References Cited

UNITED STATES PATENTS

| 1,563,314 | 12/1925 | Atanay | 107—15 |
| 2,907,286 | 10/1959 | Ruiz | 107—12 |
| 3,203,368 | 8/1965 | Cooper et al. | 107—15 |

WALTER A. SCHEEL, *Primary Examiner.*

A. O. HENDERSON, *Assistant Examiner.*